May 28, 1963 R. E. FEARON ETAL 3,091,733
APPARATUS FOR DETECTING FLAWS IN ELONGATED MAGNETIC STRUCTURES
Filed March 5, 1957 9 Sheets-Sheet 1

May 28, 1963    R. E. FEARON ETAL    3,091,733
APPARATUS FOR DETECTING FLAWS IN ELONGATED MAGNETIC STRUCTURES
Filed March 5, 1957    9 Sheets-Sheet 3

May 28, 1963 R. E. FEARON ETAL 3,091,733
APPARATUS FOR DETECTING FLAWS IN ELONGATED MAGNETIC STRUCTURES
Filed March 5, 1957 9 Sheets-Sheet 4

May 28, 1963  R. E. FEARON ETAL  3,091,733
APPARATUS FOR DETECTING FLAWS IN ELONGATED MAGNETIC STRUCTURES
Filed March 5, 1957  9 Sheets-Sheet 5

United States Patent Office 3,091,733
Patented May 28, 1963

3,091,733
APPARATUS FOR DETECTING FLAWS IN ELONGATED MAGNETIC STRUCTURES
Robert E. Fearon and Warren G. Ownby, Tulsa, Okla., assignors to Electro Chemical Laboratories Corporation, Tulsa, Okla., a corporation of Delaware
Filed Mar. 5, 1957, Ser. No. 644,037
11 Claims. (Cl. 324—37)

The present invention relates to the testing or inspecting of metal, and more particularly to a method and apparatus for testing or inspecting electromagnetically pipes, tanks, beams and other structures made from a magnetic material such as iron or steel.

In the art of testing metal structures such as pipes, tanks and the like to locate any flaws which may exist on the inside or on the outside of such structures, there are a variety of methods of inspection which are more or less useful and which replace the elementary procedure of merely looking at the metal. To some extent, the inspection methods which have been developed are of advantage over merely looking at the metal because they reveal information that cannot be seen by looking. Also, such methods are of advantage for a further reason that they render the data in a systematic form and present it quantitatively so that it can readily be compared from one specimen to the next. In general, such methods fall into three categories: (1) sonic inspection in which faults are recognized by obtaining echoes therefrom, (2) radiographic inspection in which the ability of the metal to transmit or to scatter penetrating radiation is the basis, and (3) magnetic or electromagnetic inspection which is based on the ability of a mass of metal to react differently to an electromagnetic flux if it is flawed than it will if it is flawless.

Certain aspects of the present invention are applicable to the testing and inspection of magnetic materials generally, others are of particular interest with respect to pipes such as are used for transporting oil and gas or for well casings, and still others are of particular interest with respect to structures such as tanks, beams and the like which are readily accessible from the outside but not from the inside. For convenience, the principles of the invention will be described with particular reference to pipes, although it should be understood that these principles will be applicable in general to the testing or inspection of other structures. The structures with which the present invention are concerned are magnetic structures, i.e., structures made of magnetic materials such as iron or steel.

In the rapid inspection of pipe underground and in inaccessible places, the known methods of the prior art show certain deficiencies. Some of these defiiciencies are, with respect to the sonic method, that a rapid succession of firm contacts must be made in a comparable manner to arrange the transmission of the sonic waves. Making the sonic contacts rapidly and making them exactly the same and making them all firm and effective for the transmission of sound is difficult in the presence of crusts and debris which occur inside operating pipelines. Although various procedures exist for cleaning oil and gas lines and petroleum products lines, still it remains a fact that a substantial amount of rust, scale and other debris will be found to exist inside the pipes even after the most stringent cleaning of any type now available and in common use. For such reasons as these, a sonic method is not well adapted to the requirements of pipeline survey or the survey of oil well casing. Similarly, radiographic inspection suffers from difficulties. The only type of radiographic inspection which could be conveniently applied wholly inside a pipe would be the observation of scattering of suitable radiations. If the suitable radiations adequately penetrate the wall of the pipe, and are properly sensitive to the entire thickness of the pipe, they have an opportunity to be scattered by the material of the earth which is in contact with it. Because of the effect due to the material of the earth and because of the variation in the density of substance, whether clay, sandy soil or stones large and small in contact with the pipe, errors in measurement of the pipe are brought about. Such errors in measurement as these cannot be avoided and cannot be neglected if the method of inspection is radiographic.

The basic object of the present invention has been to provide a novel and improved method and apparatus for logging the conditions in metallic walls of pipes, tanks, beams and other structures, which method and apparatus avoid the difficulties and eliminate or minimize the deficiencies of the procedures heretofore used or suggested. The method and apparatus of the invention involve the principles of magnetometry.

The method of the invention consists basically of a system of measurements based on the principles of sensitive magnetometry. Magnetometric methods have heretofore been employed in surveying the earth, yielding data relevant to local variations and subsurface geologic structures. The practice of the present invention similarly yields data relevant to structural variations within the mass of iron being tested and extending throughout the thickness thereof to and including the side opposite the side from which the inspection is being performed. A desirable feature of the magnetic inspection method of the invention is that attention can be directed exclusively to the iron and the effect of materials such as iron rust can be ignored. This desirable feature results because of the predominant passage of magnetic flux through iron and because of the fact that a flux of magnetic lines so strongly prefers a pathway through iron that in certain reasonable plans and dimensions passage through other nearby materials can be entirely ignored when iron is present.

A principal object of the invention has been to provide a novel and improved method and apparatus for showing flaws, pits, loss of iron, local alteration in magnetic properties of the iron, and to show welds and collars and other details of structure which may be or are attached to a pipe being surveyed. It is a specific object and purpose of the invention to provide means for depicting these characteristics wherever they may occur around the periphery of the pipe and to register the occurrence of such phenomena of detail of the pipe with respect to distance along the pipe and correlate it with distance so that the place where the defect is located can be identified for repair or for remedial action of whatever kind is desirable or necessary.

Another object of the invention has been the provision of means to determine and indicate whether magnetically observable differences on the pipe (indicating flaws, etc.) occurred on the bottom half of the pipe or on the top half of the pipe in a horizontally lying pipe or whether they occurred on the left side or on the right side facing in the direction in which the surveying instrument passed through the pipe.

A feature of the invention has been the provision of means employing balanced saturable cores to detect the presence of a weak magnetic flux in such a manner that an even harmonic and a modulation product indicate the presence of an external magnetic field acting similarly on both balanced saturable cores.

Still another object of the invention has been the provision of means of observing pipe which so far as possible is not critically related to the spacing of the detecting instrument away from the iron, but which in general will register chiefly the variations and flaws which it is desired to measure.

A further object of the invention has been the elimination of the previous magnetic history of the iron as a factor in the survey. Such previous magnetic history may arise from a variety of causes, such as the previous local application of magnets or because of the way the section of iron pipe previously lay on a pipe rack or in another pipeline before being assembled into the pipeline being surveyed. Without such means for removing and eliminating from consideration the influx of previous localized magnetic disturbances, it is not possible to make a reproducible measurement which is representative solely to variations in the given pipe, but instead the measurement will, in fact, observe irrelevant data to a considerable extent. Such irrelevant data would be representative of the previous local magnetization, previous assortments of magnetic poles at the ends of sections of pipe which lay in various ways in the earth's magnetic field before being assembled together, previous application of permanent magnets or electromagnets to the pipe or previous contact with highly magnetized mechanical tools. Moreover, the common use of electromagnets for lifting iron in the handling of junk also results in the presence of peculiar, irrelevant and unpredictable variations of magnetic characteristics of pipe. Means of removing all these is provided in the present invention.

A feature of the invention has been the provision of means by which the data pertaining to a pipe survey are recorded on a wire recorder or similar device wholly contained within the survey device.

A further feature of the invention has been the provision of means whereby the data so recorded on a wire or the like may be incorporated into graphical form for detailed observation by removing the record from the survey device at the end of its travel through the pipe and by playing the record back through an amplifier and demodulator system adapted to produce electrical signals which are of the kind required to deflect the pen or stylus of a suitable recording device and which are proportional to the intensity of the signal present on the wire or other device.

An object of the invention has been the provision of a survey device suitably constructed for propulsion through a pipeline under power of the fluid normally carried by the pipeline, e.g., oil or natural gas.

A further object of the invention has been the provision of means whereby the survey tool can be propagated through the pipe at a relatively uniform speed which may be less than the speed of the fluid being pumped through the pipe.

Still another object of the invention has been the provision of means for surveying a cased well by producing and recording an indication of iron deficiency in the casing produced by corrosive zones opposite the casing. Such recording will be in the detail and in the manner needed to relate such corrosiveness to characteristics of rock formations adjacent to a bore hole.

Other and further objects, features and advantages of the invention will be apparent from the following description.

The invention will now be described in greater detail with reference to the appended drawings, in which.

As indicated previously, before meaningful reproducible results can be secured by a magnetic survey of a metal structure, the structure must be given a standardized magnetic history or condition. In the case of iron pipe, a longitudinal flux of suitable strength should be created therein. This may be achieved by passing a magnet through the pipe. The magnet may be of the permanent type or it may be an electromagnet. The creation of the standardizing flux in the pipe may take place prior to or contemporaneously with the passage of the survey device through the pipe. To erase magnetic history and to provide a magnetic condition in which the pipe will yield maximum information to the survey device, the magnetic standardizer should be made from a suitable magnetic material and with suitably shaped pole pieces to deliver to the pipe walls a very strong magnetic flux. It has been found desirable in most cases for the flux to approach that at which magnetic saturation of the iron will occur. In common grades of mild steel, for example, the chief component is elemental iron, and magnetic saturation will occur with a flux density in the order of 19,000 lines per square centimeter. In general, in the practice of the invention, it is preferable to employ a magnetic flux which is of sufficient strength to insure complete eradication of the effect of former magnetic occurrencies, i.e., magnetic history. A flux density at which magnetic saturation occurs will ensure this complete eradication of magnetic history. Under some conditions of testing it is not only desirable to eradicate previous magnetic history from the pipe, but to also leave the pipe in a weak magnetic state or degaussed. This may be done by passing through the pipe either an A.C. excited electromagnet or alternately and in succession oppositely polarized magnets, each of which has a magnetizing strength weaker than the one preceding it. Such an arrangement will result in a condition of the iron which corresponds with equilibrium of the iron structure with the magnetic field of the earth. Such a magnetic condition is achieved by generally similar means by the so-called degaussing procedures. In the use of weaker fields not corresponding with total saturation of the iron, the requirement is simply that the field be strong enough to overcome previous magnetizing processes which may have occurred and remove the effects of these so far as they still remain in the iron. How strong a magnetizing field may be required to erase such previous effects depends somewhat on how strongly the previous disturbances were impressed upon the iron. In general, unless powerful electromagnets were used or other extremely potent magnetizing effects were used on the pipe being tested, a magnetic pole adapted to afford a longitudinal flux of 1000 lines per square centimeter longitudinally in the pipe should suffice to erase the results of previous disturbances. It is believed that weaker fluxes than this will not be satisfactory and it is preferable to use stronger fluxes.

In addition to achieving a standardized magnetic condition, the invention involves the sensing and recording of magnetic discontinuities in the metal walls being investigated. Such discontinuities can arise because of a loss of metal, for example, from corrosion; because of the addition of metal, for example, from welds; because of flaws in the metal; and from the structure of the metal, for example, the presence of collars and other structural details. These magnetic discontinuities give rise to phenomena susceptible of sensing and measurement, as will be described in considerable detail hereinafter. However, first there will be discussed the magnetic phenomena existing because of such a local unusual condition in the metal.

Figure 1:
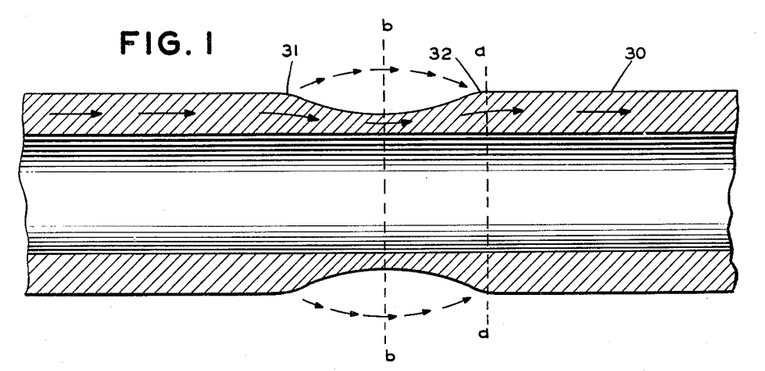
FIG. 1 is a cross-sectional view of a length of pipe having a thin place in the wall thereof.
Figure 2:
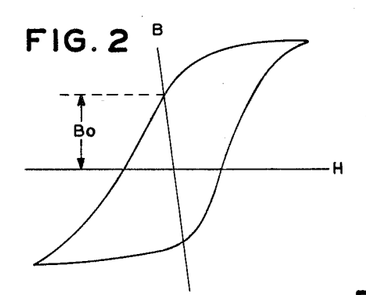
FIG. 2 is a hysteresis loop used for describing magnetic conditions in the wall of the pipe of FIG. 1.
Figure 3:
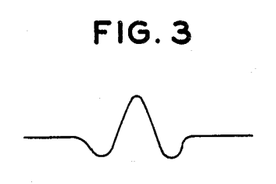
FIG. 3 is a curve illustrating the response of a detector according to the invention to the flaw of FIG. 1.
Figures 4, 5, 6:
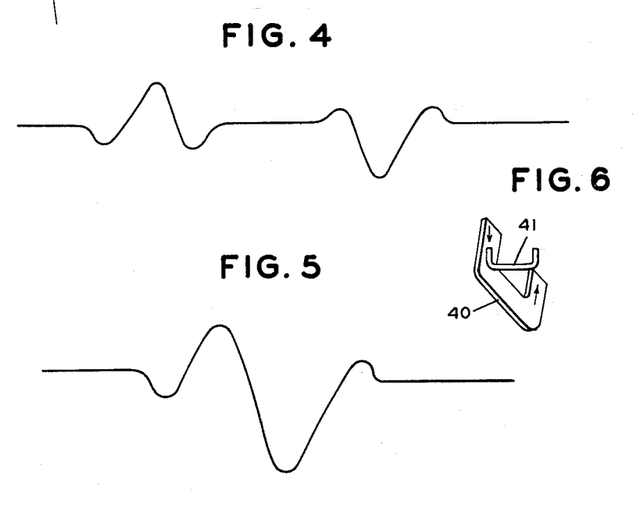
FIG. 4 is a curve similar to that of FIG. 3 illustrating the response to two oppositely poled widely spaced magnetic poles.
FIG. 5 is a curve similar to that of FIG. 4 for closely spaced oppositely poled magnetic poles.
FIG. 6 is a sketch illustrating certain principles of the invention.

Considering first FIG. 1, there is shown a section through an iron pipe 30 having a thin wall portion extending from the point 31 to the point 32 and which might be created in actual conditions by corrosion. The pipe walls on both sides of the section 31—32 are of full thickness. The thin place which is illustrated may or may not extend entirely around the periphery of the pipe, and the following discussion will be applicable in both instances. If now a very strong flux producing agency acts in such a manner as to produce a flux parallel to the axis of the pipe and acts in a sufficiently powerful manner that all of the iron, both in the section of the iron which is of full thickness and in the section which is not of full thickness, achieves relatively complete magnetic saturation, then certain conclusions proceed. If we assume that after the magnet has passed, the next condition which will prevail is a condition in which the value of the vector H parallel to the axis of the pipe is substantially zero, then considering an absence of free poles (a condition which would be fulfilled on very long uniform pipe), the iron will fall back on the hysteresis loop exhibited in FIG. 2 to a point where the left-hand branch of the loop intercepts the B axis. Assuming that all the iron of the section illustrated in FIG. 1 does, in fact, fall back to the point shown, then we can compute through the section $aa$ and the section $bb$ in FIG. 1 what is the surface integral of lines (that is, the total magnetic flux) proceeding from left to right through the full thickness section and through the thinned section, respectively. If the full thickness section has an area of X square centimeters and the thinned section has an area of Y square centimeters, as exhibited in the planes $aa$ and $bb$, respectively, and if X is greater than Y, then we may write that the flux under the conditions of relaxation of field as given previously through the thick section $B_0X=\phi_0$ for the thick section and $B_0Y=\phi_1$ for the thin section, since X is greater than Y, the flux $\phi_0$ is greater than the flux $\phi_1$. Since, however, flux must be continuous throughout space and magnetic flux cannot be absorbed or eliminated anywhere in view of the general theory of magnetism, this condition can only exist if the extra portion of the flux which corresponds with the thick section passes through the air or through space adjacent to the thin section to maintain continuity. Again, as is expected in the theory of magnetization, there will be regions in the vicinity of the thinned section where the flux enters and leaves the zone where the thinning down occurs on both sides of the thinned section. As would be expected, the zone where the flux leaves has the characteristics of a free pole and the zone where it re-enters the iron has the characteristics of a free pole of opposite polarity and equal total flux strength. Accordingly, in view of these considerations, a flaw in the iron will exhibit itself as an alternate system of two magnetic poles. The presence of such magnetic poles will be observed and recorded by the detector or sensing element of the invention. A possible detector response to a single pole where the opposite pole is very remote is shown in FIG. 3. Such a response to a succession of two opposite poles spaced apart a short distance is illustrated in FIG. 4. FIG. 5 shows such a response for two opposite poles spaced close together. In FIGS. 4 and 5 the pole pitch may be considered as extending from the maximum to the minimum, one representing a north-seeking pole and the other a south-seeking pole. The curve of FIG. 5 may be considered typical for a single isolated flaw as identified by the apparatus to be described in connection with FIG. 12. If the magnetic flux passes through the iron in the direction indicated by the arrows in FIG. 1, a north-seeking pole will be set up adjacent the point 31, while a south-seeking pole will be set up adjacent the point 32. Similar but much weaker poles will result from the presence of relatively weak fluxes, such as that resulting from the earth's magnetic field.

It should be understood that magnetic poles indistinguishable from those caused by the earth's magnetic field acting on a flaw could be created by magnetic disturbances unrelated to discontinuities in the iron. Since such magnetic poles would produce records which would obscure a log of the pipe, it is desirable that they be eliminated by creating a standardized magnetic condition in the iron. Use of a strong field to effect the standardized condition will also enhance the formation of poles marking conditions in the iron whose presence it is desired to record.

FIG. 6 illustrates generally the basic principle of one form of the invention, although it should be understood that this figure does not purport to show a working device. In FIG. 6, there is shown a magnet 40 having north and south poles arranged so that the flux will enter and leave according to the arrows. The magnet 40 may be of the permanent type or it may be an electromagnet. When the magnet 40 is placed in a pipe it produces a longitudinal, i.e., axial, flux in the pipe walls. A sensing element 41 is provided which is responsive to weak magnetomotive forces and is arranged to be sensitive in a direction perpendicular to the longitudinal flux produced by the magnet 40. If the environment of the sensing system is magnetically homogeneous, no magnetomotive force will be exerted on the sensing element 41 since its poles lie in the equatorial plane of the magnet 40. When a disturbance exists, such as, for example, is produced by local poles caused by flaws and the like, a magnetomotive force will be exerted on the element 41. Local differences of permeability in the magnetic structure being surveyed will set up local poles because of the axial magnetic field from the magnet 40, and these local poles will cause a magnetomotive force to be exerted on the sensing element 41.

Figure 7:
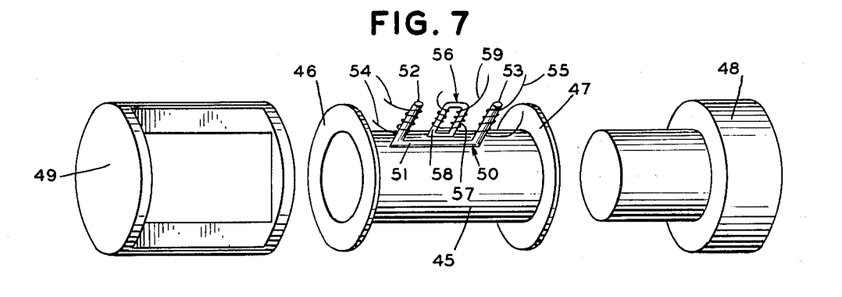
FIG. 7 is a diagrammatic illustration of one form of survey device constructed in accordance with the invention.

FIG. 7 shows a sensing device separate from the standardizing magnet. In this figure, which is exploded for clarity, there is provided a non-magnetic core 45 having flanged ends 46 and 47 whose diameter is such that the periphery of the flanges approaches the interior pipe surface when the device is located in the pipe. The core 45 and the flanges 46 and 47 do not enter into the magnetic circuit to be described and hence may be made of any suitable non-magnetic material. A forward end 48 may be affixed to the flanged end 47 and may be constructed, in a manner to be described hereinafter, to facilitate passage of the sensing device through the pipe. A rear end 49 may be affixed to the flanged end 46 and similarly may be constructed to facilitate passage through the pipe. The end 49 may conveniently carry the necessary electronic components of the sensing device.

A magnetic core 50 has a central portion 51 parallel to and supported by the core 45. The portion 51 may be imbedded in the core 45 for mechanical support. Radially extending ends or legs 52 and 53 of the core 50 carry windings 54 and 55, respectively. Another core 56 of saturable magnetic material having radially extending legs 57 and 58 is located symmetrically between the legs 52 and 53. The legs 57 and 58 are joined at both ends to form a complete magnetic path. The legs 57 and 58 carry a coil 59, as shown. The bottom legs of the core 56 is parallel to and adjacent to the leg 51 and is supported by the core 51.

If the center coil 59 is supplied with a suitable alternating current, e.g., a sinusoidal 750 cycle signal, an alternating flux will be set up in the cores 56 and 51. This flux will have an axial (i.e., parallel to the leg 51) component which will tend to produce equal electromotive forces in the side coils 54 and 55. These side coils should be wound in opposite senses and connected so that the E.M.F.'s generated thereby will be of opposite polarity.

The magnetic fluxes produced in the legs 52 and 53 link the side coils 54 and 55. These fluxes are caused by the fluxes flowing in legs 57 and 58, and leaking therefrom through the leg 51. An important characteristic of the fluxes in the legs 52 and 53 is that the fundamental, e.g., 750 cycle, component always cancels out, but the second harmonic, e.g., 1500 cycle, component due to harmonic generation in the iron of structure 56 does not always cancel out. In fact, the magnitude and relative phase of the 1500 cycle component is responsive to net flux entering 56 from the metal structure being tested, i.e., along the top leg of the structure 56, and leaving where it lies closest to leg 51. When the instrument is run in a pipe, the vicinity of the outwardly projecting portion of 56 is receptive to fluxes originating in the pipe, and which may indicate the presence of flaws or other anomalies therein. These fluxes originating in the pipe are in a direction generally perpendicular to the direction of motion of the sensing device. In the embodiment of FIG. 7, the flux path will be limited generally to a narrow arc of the pipe periphery determined by the radial position of the coils 54, 55 and their respective cores. The reluctance of the inward and outward magnetic paths will be different whenever the characteristics of the iron for one path differ from the characteristics of the iron for the other path. For example, a flaw in the iron, a weld or a collar will produce a local magnetic pole, as described. The presence of such a pole creates an asymmetrical magnetic condition such that a net radial magnetomotive force will be produced at even harmonics. For a sinusoidal input signal, the second harmonic will be the predominant harmonic. However in order to achieve a substantial harmonic content with a sinusoidal input signal, the input signal to the coil 59 should be of sufficient strength to saturate the core 56, so that the E.M.F.'s induced in the windings 54 and 55 will be distorted. While complete saturation is not indispensable, the core 56 should be operated in a range in which it will exhibit non-linearity. In general, the greater the non-linearity the better will be the operation.

Figure 14:
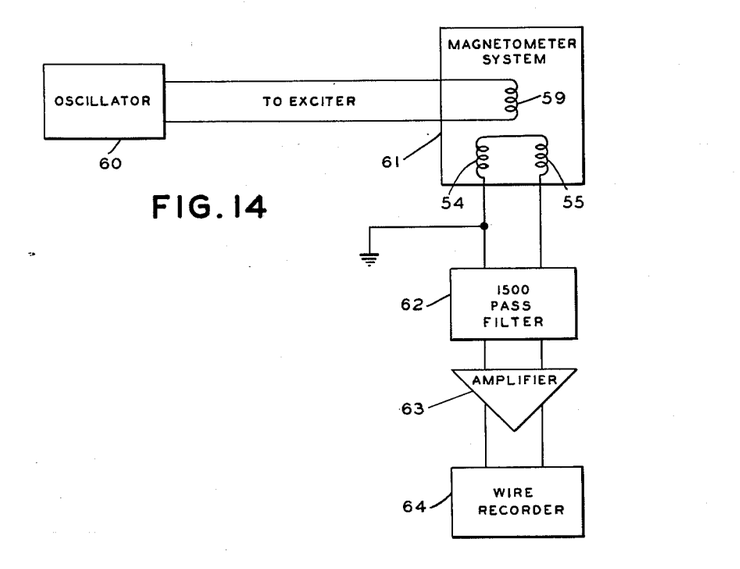
FIG. 14 is a block diagram of an electrical and magnetic system for carrying out the invention.

The net radial magnetomotive force sets up a net E.M.F. in the side coils 54 and 55. The coils 54 and 55 may be connected together in series or in parallel, so long as their directions of winding are opposite or in other words so long as they link the fluxes in opposite directions. The net E.M.F. may be filtered, amplified and recorded, as indicated in FIG. 14. In this figure, an oscillator 60 supplies alternating current to the exciter coil 59 of the magnetometer system 61, which may be of the type just described. The net E.M.F. in the coils 54 and 55 is supplied to a filter 62, which may be tuned to the second harmonic of the frequency supplied by the oscillator 60. The output of the filter 62 is amplified in an amplifier 63 and recorded on a suitable recording device 64. The recorder 64 is preferably of the wire or tape recorder type since the physical size of this type of recorder is relatively small for a given capacity, and hence is most conveniently incorporated in the sensing device. The elements 60–64 may be mounted in the end 49.

Figure 15:
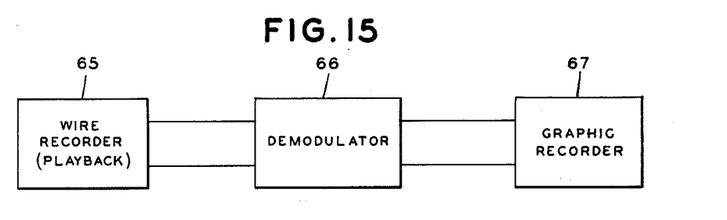
FIG. 15 is a block diagram of a system for graphically recording the data obtained in the system of FIG. 14.

After the sensing device has traversed the pipe length to be tested, the wire may be removed from the recorder 64 and placed in a playback set 65 (FIG. 15). The output of the set 65 is demodulated in a conventional linear demodulator 66, which may be of the simple diode or rectifier type, and the resultant signal is recorded for visual observation on a graphic recorder 67. A typical data record is illustrated in curve A of FIG. 25. Where it is convenient to have a wire line connected to the sensing instrument, for example when surveying a well casing or an easily accessible pipe, the local recorder may be omitted and the signal transmitted over the wire line to a graphic recorder at a remote location.

The structure of FIGURE 7 can be modified by replacing the coils 54 and 55 with a single coil (not shown) wound around the core 56 with each turn encompassing both legs 57 and 58. The net E.M.F. set up in such a coil will be equivalent to the net E.M.F. set up in both coils 54 and 55.

The sensing structure of FIGURE 7 is responsive to magnetic anomalies occurring over a limited extent of the periphery of the pipe. Additional sensing structures may be provided to increase the arc of the pipe periphery being tested. Such additional structures would be spaced angularly from the structure shown and may have corresponding coils connected in parallel.

Figure 8:
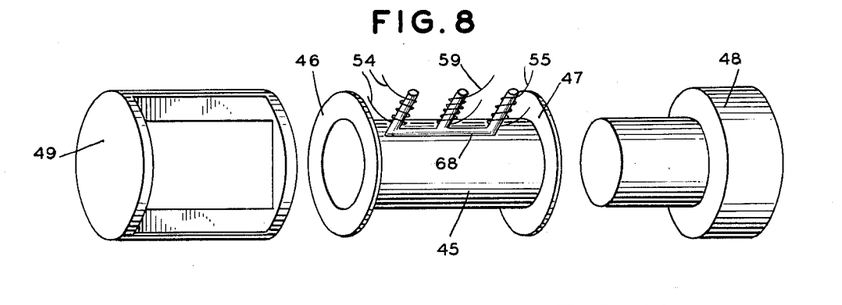
FIG. 8 is a diagrammatic illustration of another form of survey device constructed in accordance with the invention.

The sensing device of FIGURE 7 is effectively a magnetic amplifier in which modulation is produced in accordance with magnetic anomalies existing in the structure being tested. Such an arrangement is preferred since the energy levels of signals produced in response to magnetic anomalies may be relatively high. However, a self-generating type of sensing device may be used in some cases. Such a device is illustrated in FIGURE 8. In FIGURE 8, an E-shaped magnetic core 68 corresponding to the core 50 is provided. Coils 54, 55 and 59 are wound on respective legs of the core 68 in a sense to aid each other with respect to the flux entering the center leg of the core 68 from the pipe. The net E.M.F. generated in the coils 54, 55 and 59, as a result of the motion of the core 68 through the pipe will vary as the derivative with respect to time of the net radial magnetomotive force and hence will be sensitive to the velocity of the sensing device. No net E.M.F. will be generated in the coils as a result of the unchanging axial flux in the pipe since such flux will be cancelled out in the core 68. Only radial fluxes, resulting from magnetic anomalies, will produce an output E.M.F. The output may be amplified and recorded to yield a log. It will be evident that either the coil 59 or the coils 54 and 55 may be omitted.

Figure 9:
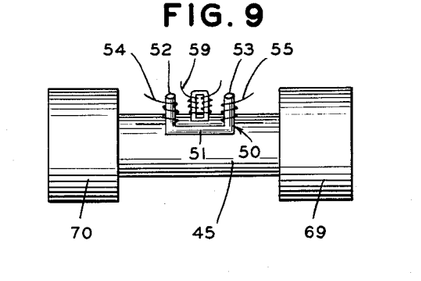
FIG. 9 is a diagrammatic illustration of a survey device similar to the type illustrated in FIG. 7 combined with apparatus in accordance with the invention for removing the previous magnetic history of a pipe.
Figure 11:
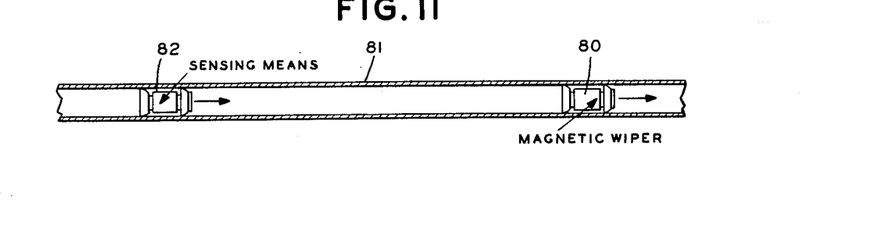
FIG. 11 is a longitudinal cross-sectional view of a length of pipe and illustrating one method of practicing the invention.

FIG. 9 is a diagrammatic illustration of a survey device similar to that of FIG. 7. In FIG. 9 there are provided permanent magnets 69 and 70 of the radial type. The axial spacing of the permanent magnets 69 and 70 should be sufficiently great that tilting of the device will not unduly distort the standardizing magnetic field. The peripheries of these magnets should be of opposite polarity to create a strong standardized axial magnetomotive force in the pipe. This unvarying magnetomotive force creates, in effect, a standardized magnetic history in the iron. Instead of having the magnetic standardizer pass through the pipe in fixed relation to the sensing device, as in FIG. 9, it is preferred to pass a magnetic standardizer through the pipe in advance of the sensing means, as is illustrated in FIG. 11. The magnetic standardizer may be passed through the pipe any desired time in advance of the sensing means, the only limitation being that the time not be so long, having regard to the location of the pipe, that local magnetic conditions in the pipe are likely to change.

Figure 10:
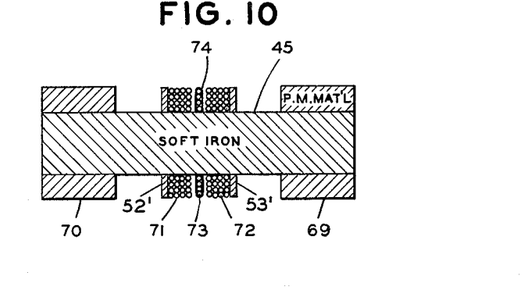
FIG. 10 is a cross-sectional view illustrating a device similar to that of FIG. 9, but with a different form of sensing device or element.

The combined sensing and wiping means of FIG. 10 is similar to that of FIG. 9. However, in the case of FIG. 10, the coils 71 and 72 corresponding to the coils 54 and 55, respectively, are wound directly on the soft iron core 45. The coil 73, corresponding to the coil 59 is similarly wound on the core 45 between the coils 71 and 72. Soft iron flanges 52' and 53' are provided on respective sides of the coils 71 and 72. The coil 73 is wrapped with a saturable steel or other magnetic material tape 74. The flux set up as a result of the exciting current supplied to the coil 73 saturates the tape 74 so that it acts as a non-linear reluctance element analogous to a rectifier used as a modulating element. In the presence of an ambient magnetic field, such as is caused by the presence of a flaw in the pipe, the tape on one side of the coil 73 becomes saturated more rapidly than the tape on the other side. A net E.M.F. will be induced in the side coils 71 and 72 because of the resulting unequal reluctance of the outgoing and incoming radial flux paths. These radial flux paths include a respective side of the tape 74, i.e., the left and right sides as shown in FIG. 10 and flanges 52' and 53'.

The frequency response of the recording device limits the frequency of the alternating current which may be supplied to the coil 73. If the recording device has a sufficiently high frequency response, high frequency signals may be used. In such case a ferrite material might be desirable for the tape 74.

The permanent magnet flanges 69 and 70 of FIGS. 9 and 10 need not be used if a standardizing magnet is sent through the pipe in advance of the detecting device. This is illustrated in FIG. 11 in which a magnetic standardizer 80 is shown passing through pipe 81 in advance of sensing device 82. Under actual operating conditions, the standardizing magnet will usually be caused to pass through the pipe length completely prior to insertion of the sensing device in the pipe.

Figure 12:
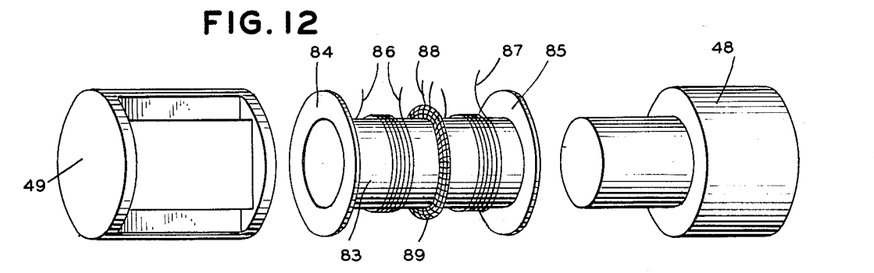
FIG. 12 is a diagrammatic illustration of a survey device in accordance with the invention employing a sensing element of the type shown in FIG. 10 and adapted to register iron loss over the entire periphery of the pipe.

A sensing device of the type shown in FIG. 10 but without the permanent magnets is illustrated in FIG. 12, which is exploded longitudinally for clarity. In FIG. 12 a hollow soft iron core 83 is provided with soft iron flanges 84 and 85 whose radii are slightly smaller than the pipe radius. The term soft iron, as used herein, means magnetically soft. Coils 86 and 87 (corresponding to the coils 71 and 72) are wound on the core 83. A coil 88 provided with a steel tape wrapping 89 is wound about the core 83 between the coils 86 and 87. In this case, the flux paths to the pipe walls include the flanges 84 and 85. The flanges 84 and 85 act to limit the detecting zone near the periphery of the sensing device to a region of space flaring outwardly from the longitudinal axis of the sensing device. The greater the radius of the flanges 84 and 85 and the closer these flanges come to the coils 86 and 87, the more limited will be the boundaries of the detecting zone and the sharper will be the response of the instrument to magnetic anomalies. In other words, when the flanges 84 and 85 approach in radius the internal pipe radius and when these flanges are closely spaced axially with respect to the coils 86 and 87, the output pulses plotted with respect to movement of the instrument along the axis of the pipe will have steep sides, which facilitates accurate determination of the location of the magnetic anomalies with respect to the pipe length. The flanges 84 and 85 may be reduced in size or omitted, but this is not preferred since the region of sensitivity will be broadened, tending to make log interpretation more difficult.

Figure 13:
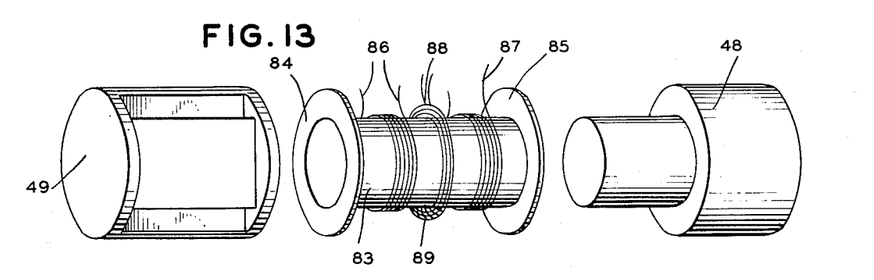
FIG. 13 is a diagrammatic representation of a survey device similar to the one illustrated in FIG. 12, but with sensitivity limited to a particular quadrant or sector.

Since generation of an appreciable net E.M.F. in the coils 86 and 87 is dependent on saturation of the steel tape 89 (one side of which becomes saturated more rapidly than the other upon presence of a free pole in the magnetic path of the flux passing therethrough) detection of flaws or other magnetic anomalies in the pipe walls can be restricted to any desired arc of the pipe periphery. Thus while the steel tape 89 in FIG. 12 extends all the way around the coil 88 and hence core 83 in FIG. 12 and thus provides detection through an arc of 360°, the steel tape 89 in FIG. 13 is limited to a much smaller arc and hence detection of magnetic anomalies is correspondingly limited to substantially the same arc of the pipe circumference. The magnetic material tape may be provided at as many places as desired around the circumference of the core 83 to provide detection in corresponding arcs of the pipe circumference.

The net electromotive force in the coils 86 and 87 may be filtered (to pass the second or other selected even harmonic), amplified and recorded, as illustrated in FIG. 14. The graphic reproduction of the recorded data, produced as shown in FIG. 15, may look like the curve A of FIG. 25 in which magnetic anomalies appear as pips or departures from the average value. The extent and amplitude of the pips will, of course, be dependent on the characteristics of the anomaly.

Figure 25:
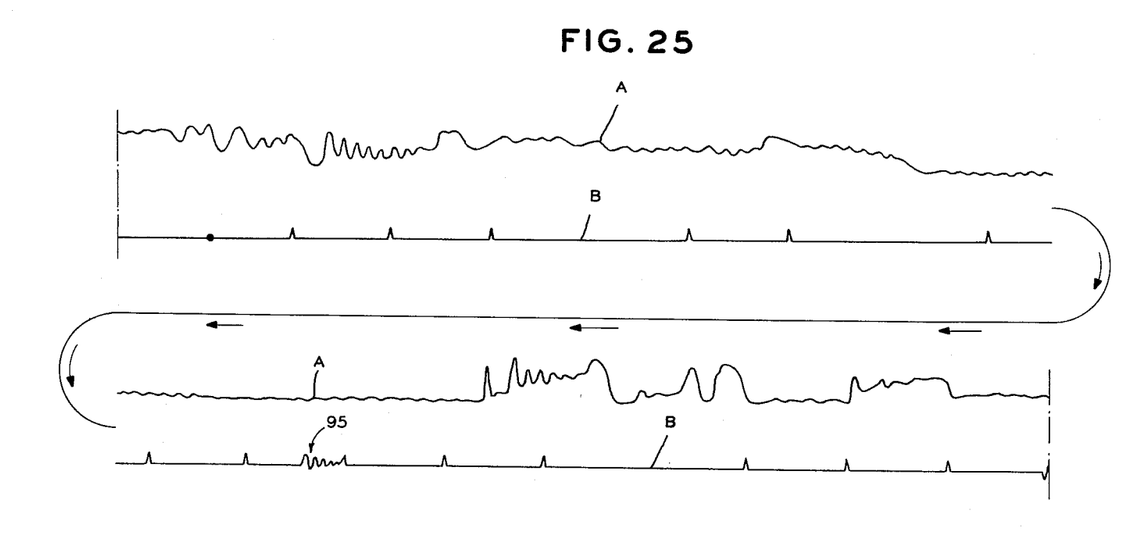
FIG. 25 is a typical data record showing the survey of a length of pipe.

For the curve A of FIG. 25 to be useful, it is necessary to know as closely as possible the physical location of the anomaly on the pipe corresponding to each pip. If the velocity of the sensing device in the pipe were absolutely uniform, then the physical location of the flaw or other anomaly would be directly proportional to the location of the pip on the time axis of the curve. In general, however, such an ideal condition can not be exactly achieved. However, in accordance with the invention, means is provided for producing indications on the record corresponding to physical progress of the sensing device. One such means is illustrated in FIG. 16 and may conveniently be located physically in the ends 48 and 49 of the sensing device.

Figure 16:
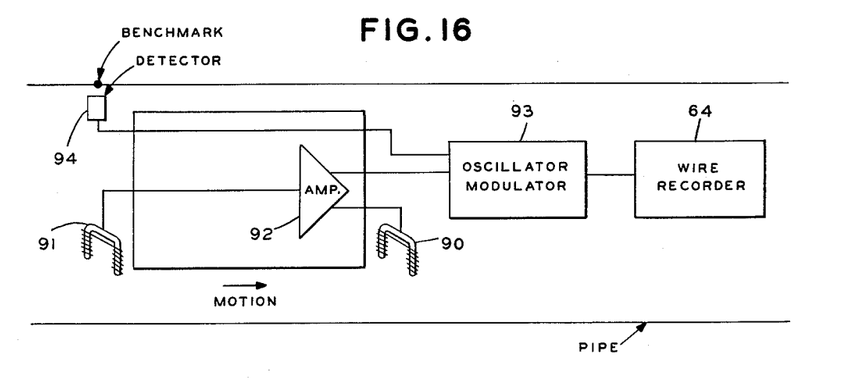
FIG. 16 is a block diagram illustrating an arrangement in accordance with the invention for accurately recording the location of a survey device in a pipe.

In FIG. 16, there are provided two electromagnets 90 and 91 separated by a desired axial distance and located in the same axial plane. The magnet 90, which may be termed the marking magnet, is preferably located adjacent the front or leading end of the sensing device, while the magnet 91, which may be termed the pickup magnet, is preferably located adjacent the rear or trailing end of the sensing device. The magnet 90 is constructed and located so that each time its coil is provided with a sharp impulse of current, a corresponding spot on the adjacent pipe wall is magnetized. The poles of the magnet 90 should be oriented so that the magnetized spot will have little or no flux extending in a longitudinal direction, since such longitudinal flux would look to the sensing element as a flaw or other magnetic anomaly. A peripheral flux, on the other hand, will have little or no effect on the sensing element. The pickup magnet 91 is oriented in the same way as the magnet 90 so that a voltage will be induced in the coil of the magnet 91 as it passes the magnetized spot laid down by the magnet 90. The voltage induced in the coil of the magnet 91 is amplified in an amplifier 92 and is supplied to the electromagnet 90 to cause the latter to lay down another mark which in turn will be picked up by the electromagnet 91. It will be evident that the spacing between marks is dependent only on the spacing between the magnets 90 and 91 and not on the velocity of the device in the pipe. The current pulse which lays down the mark is preferably very sharp so as to accurately locate the marks and also to prevent any appreciable axial flux component from the marks. For this purpose, the amplifier 92 is preferably of the non-linear peaked type.

The amplified output of the amplifier 92 is also supplied to an oscillator-modulator stage 93. The oscillator carrier frequency is modulated by the output pulses of the amplifier 92. This modulated carrier is supplied to the recorder 64. The carrier frequency should be selected so that, with its sidebands, it is outside the range of the sidebands of the detector carrier supplied to the recorder 64 by the amplifier 63 (FIG. 14). The recorded signal, when graphically reproduced (as in FIG. 15) results in a separate information carrier with periodic pips, as shown by the curve B of FIG. 25. Each of the simple pips of the curve B represents an equal axial travel of the device. The actual spacing of the pips in the time scale may vary, as illustrated, because of changes in velocity of the device in the pipe.

As described, the distance between adjacent simple pips on curve B is equal to the spacing between magnets 90 and 91. If a different scale should be desired, the amplifier 92 could be constructed so as to cause marks to be laid down at multiples of the distance between the magnets. The initial marking impulse as the sensing device travel commences can be provided externally.

The facilitate correlation between pips on curve A of FIG. 25 and specific physical places on the pipeline, suitable benchmarks may be provided at known positions along the pipe, for example, at stream crossings or the like. A suitable benchmark could be produced by magnetizing a point on the pipe with a strong magnetomotive force or exposing a point on the pipe to a gamma ray source. The orientation of the benchmark, with respect to the periphery of the pipe, if a magnetic mark is used, is preferably such as to be a considerable angular distance from the marks laid down by the magnet 90. A detector 94 is provided to sense the presence of the benchmarks and to produce a distinctive modulation on the carrier generated by the oscillator 93. For example, the detector 94 could shock excite the oscillator tank circuit to produce a transient modulation as indicated at 95 in FIG. 25. The benchmark modulation record is preferably such as not to obscure the position indications resulting from pick up by the magnet 91.

Figure 17:
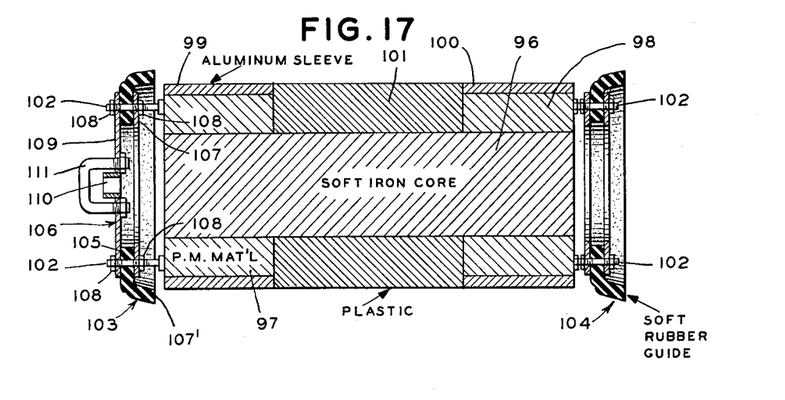
FIG. 17 is a longitudinal cross-sectional view of one form of magnetic standardizer according to the invention.

FIG. 17 illustrates a practical magnetic standardizing device, according to the invention, for achieving a standardized magnetic history. The device of FIG. 17 comprises a soft iron core 96 having radial permanent magnets 97 and 98 mounted thereon adjacent respective ends thereof. The periphery of one of these magnets should be a north pole while the periphery of the other should be a south pole in order to set up an axial flow of flux through the pipe walls as the device passes through the pipe. The magnets 96 and 97 preferably have a high coercive force to resist self-demagnetization. While the diameter of the permanent magnets should be approximately that of the internal diameter of the pipe, it is desirable that some gap be provided to minimize attraction between the magnets and the pipe walls. Non-magnetic sleeves 99 and 100 may be used to ensure a minimum air gap. The space between the magnets 97 and 98 may be filled with any suitable material, such as a plastic 101.

A number of threaded studs 102 project from the walls of the magnets 97 and 98 for affixing guide members 103 and 104. The guide member 103 is formed as an annular washer having a vertical portion 105, which is clamped in place between annular metal washers 106 and 107, and a rearwardly extending flange portion 107 which is adapted to be in sliding contact with the pipe walls. The washers 106 and 107 are held in place and in clamping relationship to the washer 103 by nuts 108 threaded on the studs 102. The face 109 of the washer 106 is made solid to prevent the passage of fluid except through a central opening 110. A U-bolt 111 may be provided in the washer 106 to facilitate handling of the device. The rear guide 104 is similarly constructed except that both of the metal washers are open except for the guide clamping faces.

In operation, the device is placed in the pipe with the washer 103 leading and with the flange portions of the washers 103 and 104 in contact with the pipe walls. The fluid, e.g. oil or gas, traveling through the pipe exerts a force on the rear end of the device, causing it to travel along the pipe. Some fluid enters through the holes in the rear annular washers, passes around the outside of the sleeves 99, 100 and 101 and passes out through the opening 110, so that the velocity of the device will be less than that of the fluid. If desired, the size of the opening 110 may be adjusted to vary the speed of the device. In some cases, especially for smaller diameter pipes, it will be desirable to provide a longitudinal hole in the soft iron core 96 to permit passage of fluid.

Figure 22:
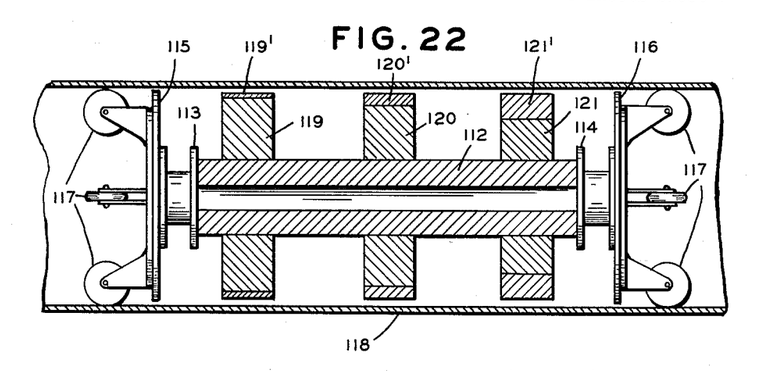
FIG. 22 is a longitudinal cross-sectional view of a length of pipe with another form of magnetic standardizer and degausser according to the invention located therein.

Another practical form of standardizing device for eradicating magnetic history in a pipe and degaussing is illustrated in FIG. 22. In FIG. 22 the standardizing device has a hollow soft iron core 112 supported from flanges 113 and 114 carried by platforms 115 and 116, respectively. The platforms 115 and 116 are provided with wheels or casters 117 arranged to be in contact with the pipe walls 118 for supporting the device in the pipe. The soft iron core 112 carries spaced radial permanent magnets 119, 120 and 121, the peripheries of which are successively oppositely poled. The magnets 119, 120 and 121 are provided with non-magnetic sleeves 119′, 120′ and 121′, respectively. Sleeve 120′ is thicker than sleeve 119′ and sleeve 121′ is thicker than sleeve 120′ so that, if the magnets are of equal strength, the increasing gap will cause less flux to pass into the iron from the successive magnets. In this way the magnet field set up between the magnets 119 and 120 will be followed by a weaker and recessed field set up between the magnets 120 and 121, which has been found to be a desirable way to achieve magnetic history removal along with degaussing. If desired, more magnets may be provided to control further the relaxation of the degaussing field. Also, magnets of equal diameter but successively decreasing strength may be used.

The degaussing device of FIG. 22 is forced through the pipe 118 by action of the fluid on the platform 116. Fliud may be passed through the hole in the core 112 to reduce the velocity of the degaussing device, and a diaphragm may be provided to control the effective diameter of the hole and thus provide velocity control in a manner responsive to the speed of movement of the instrument relative to the pipe. A suitable soft rubber or other gasket may be provided to prevent passage of fluid past the periphery of the platforms 115 and 116. If desired, the space between the platforms and/or the magnets may be filled with a non-magnetic material.

While the magnetic standardizing devices illustrated have been shown as using permanent magnets, electromagnets can of course be used. In such case local battery power or, where appropriate, cable transmitted power, can be used for magnet excitation. A standardizing electromagnet using alternating current excitation will achieve a standardized magnetic condition provided the excitation frequency is sufficiently low to penetrate the iron walls, e.g. two to five cycles per second for most pipes.

While standardization of the iron may be effected through the use of high flux densities to achieve substantial saturation, as previously described, a somewhat lower flux density may be used to achieve a standard equilibrium condition in the iron by subjecting the iron to successive reversals of magnetic polarity, as with the apparatus of FIG. 22, although the successive fields need not decrease in strength. Subjection of iron to successive reversals of magnetic fields achieves a cyclical equilibrium. Use of a standardizing field of saturating strength, as with the apparatus of FIGS. 9 and 10, may be considered as the limiting case in which the field is sufficiently strong that cyclical equilibrium is achieved with a single reversal of polarity. Cyclical equilibrium achieved with reversals of successively decreasing field strength will leave the iron in a degaussed condition, i.e., with a small or zero magnetization. In the case of a pipe, the iron is left in equilibrium with the earth's magnetic field, which is the usual degaussed condition of a large mass of iron.

Figure 18:
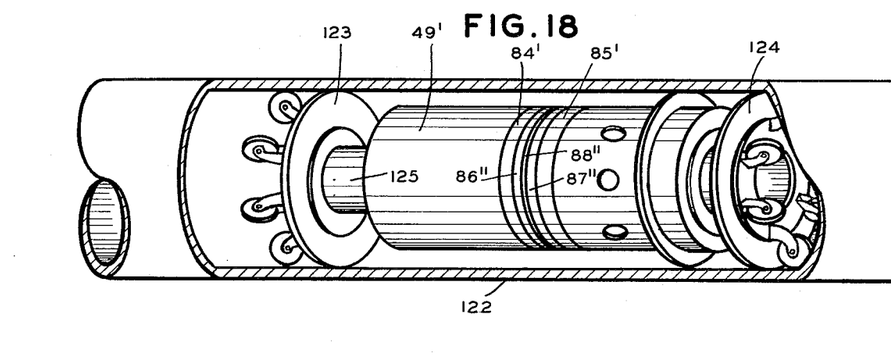
FIG. 18 is a longitudinal cross-sectional view of a length of pipe with a survey device constructed in accordance with the invention shown therein.
Figure 19:
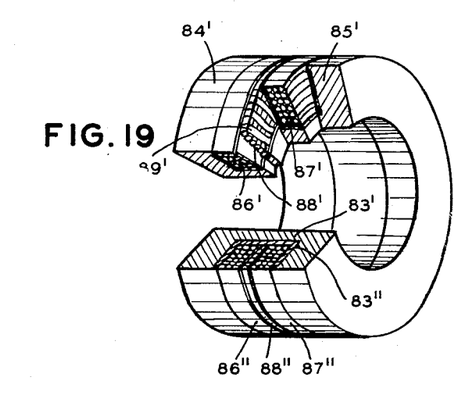
FIG. 19 is an enlarged detail view, partly in cross section, illustrating the construction of the detecting element of the survey device of FIG. 18.

Referring now to FIGS. 18 and 19, there is illustrated one practical form of construction for a sensing device according to the invention. The particular sensing device shown is of the type illustrated in FIG. 12. In FIG. 18, the pipe is shown at 122. Wheeled spaced platforms 123 and 124, similar to the platforms 115 and 116 of FIG. 22, are provided to carry the sensing device through the pipe 122. A core 125 extends between the platforms 123 and 124. The core 125 is preferably hollow to permit the flow of fluid therethrough and is preferably made from non-magnetic material.

The core 83, the flanges 84 and 85, the coils 86, 87 and 88 and the tape 89 of FIG. 12 are designated with similar but primed reference numerals in FIGS. 18 and 19. The core 83' is mounted on the core 125 at an intermediate position. The coils 86', 87' and 88' are provided with non-magnetic covers 86'', 87'' and 88'', respectively. The coils are mounted in a U-shaped annular magnetically soft iron sleeve 83'', which fits into a corresponding socket in the non-magnetic core 83'. The tape 89' is preferably an easily saturable magnetically soft iron. It might be, for example, .001" thick. The spacing between the flanges of the sleeve 83'' and the inside surface of the pipe 122 is somewhat exaggerated in FIG. 18, since the air gap therebetween should be much smaller than the axial spacing between the flanges of 83''. A compartment 49', located adjacent the sensing elements, may be used to carry the electronic components of FIGS. 14 and 16 and a suitable power supply. The detecting and marking elements of FIG. 16 are not shown in FIG. 18, but may be located at any suitable place, preferably adjacent the ends of the sensing device. Propulsion of the sensing device is accomplished in the same manner as described for FIG. 22. For logging an empty pipe, some or all of the wheels may be powered. For logging a cased well, the device will be raised and lowered vertically by a wire line. Signal information from the device may be transmitted via cable under certain conditions where convenient and where the recording and playback would be a handicap.

It should be observed that the principles of the invention are applicable to the surveying of cased wells since corrosion of the casing and hence the thickness of the casing wall from point to point is dependent on the character of the surrounding strata so that a log showing the corroded areas of the casing will yield desired information on the character of the earth formations surrounding the well from point to point.

As pointed out previously in connection with FIG. 13, the magnetic tape 89 or 89' may be omitted over one or more arcs of the pipe periphery in order to restrict detection of anomalies to a selected arc or arcs opposite the tape wound portion or portions. Two or more separate assemblies of elements arranged to log different arcs of the pipe circumference may then be used. For example, one assembly could be used to survey the entire circumference to show particularly welds, collars and other large discontinuities. Another assembly could be used to give particular attention to corrosion in the bottom zone of the pipe. The construction of FIG. 19 can be used to provide two sensing channels by providing two steel tape wrapped coils 88' (not shown) and exciting each of these coils with a different exciter frequency. The exciter second harmonic frequencies should, in such case, be widely separated to permit convenient separation by filtering before demodulation. The steel tapes should be isolated from each other to reduce any tendency for inter-modulation to occur.

Plural channel sensing may also be achieved with constructions of the type shown in FIGS. 7 and 8 by providing a plurality of angularly spaced sensing elements.

Figure 20:
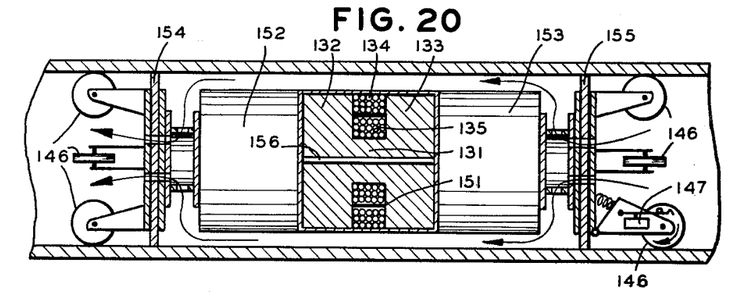
FIG. 20 is a longitudinal cross-sectional view of a length of pipe containing a different form of survey device according to the invention.
Figure 21:
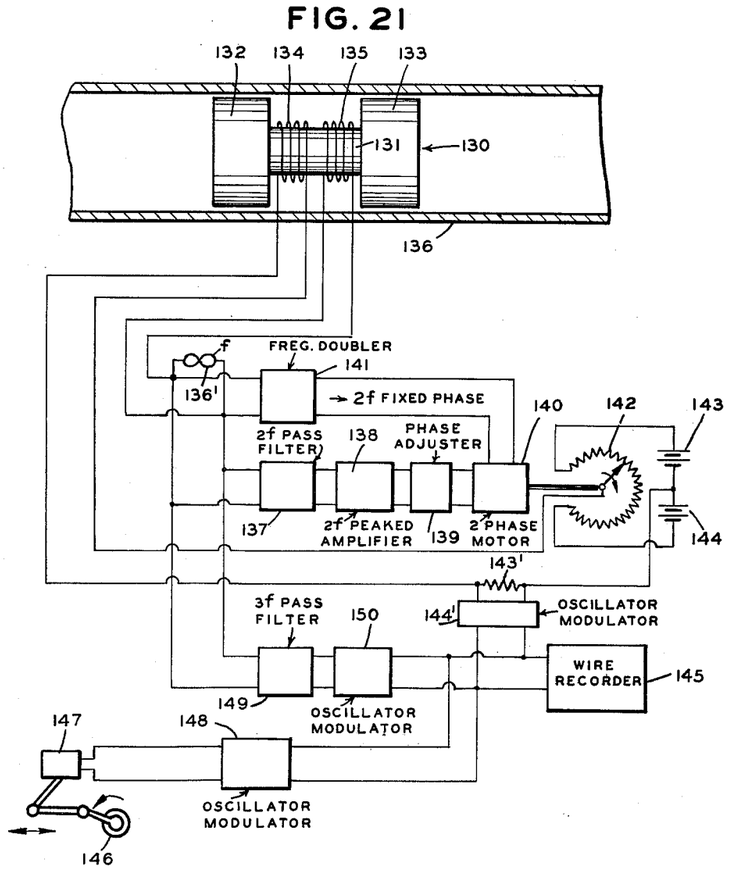
FIG. 21 is a diagrammatic illustration of the survey device of the type shown in FIG. 20 with a block diagram of the operating circuit thereof.

In accordance with a further aspect of the invention, a modified method and apparatus for sensing magnetic anomalies in iron will now be described in connection with FIGS. 20 and 21, FIG. 21 being a block diagram and FIG. 20 representing a practical construction. Referring now to FIG. 21, an electromagnet 130 having a core 131, spaced pole pieces 132 and 133 and exciting coils 134 and 135 is located within a pipe 136 and arranged to traverse the pipe in an axial direction. The faces of the pole pieces 132 and 133 are located so that the pipe walls will be included in the magnetic circuit.

The coil 135 is supplied with alternating current at a frequency $f$ from a suitable source 136'. The resultant flux set up in the electromagnet 130 should be sufficiently strong to saturate the pipe walls between the pole faces. However, the flux should not be strong enough to saturate the core 131 or the pole pieces 132 and 133 since these should be operated on the linear portions of their hysteresis loops. To ensure complete saturation of the pipe iron throughout its entire thickness, the frequency $f$ should be relatively low and may be of the order of two to five cycles per second for usual pipe wall thicknesses. Saturation of the pipe iron in the magnetic circuit in the presence of an ambient magnetic field in the pipe iron results in a non-linear load on the coil 135, in turn distorting the waveform of the voltage supplied thereto. This distorted waveform will have a high even order harmonic content with the second harmonic predominant. The saturated iron acts as a non-linear reluctance element (in much the same manner as the steel tape 89 of FIG. 12) and intermodulation of the ambient flux and alternating flux results in the harmonic generation. The second harmonic of the voltage from the source 136' is passed through a tuned filter 137, is then amplified in a peaked amplifier 138, is adjusted in phase by a phase adjuster 139 and is supplied to one phase winding of a two phase motor 140. The signal from source 136 is also supplied to a frequency doubler 141 which delivers a double frequency signal of fixed phase to the other phase of the two phase motor 140. The phase adjuster 139 is employed to ensure that the amplified $2f$ signal (from amplifier 138) will be in phase or 180° out of phase with the $2f$ signal from the frequency doubler. The phase of the amplified $2f$ signal will be dependent on the direction of the ambient field present in the pipe iron. If the ambient field in the pipe iron is zero, there will be no amplified 2f signal and the motor 140 will not operate. An ambient field in one direction will produce an amplified 2f signal in or out of phase (as the case may be) with the double frequency signal, resulting in motor operation in one direction. An ambient field in the other direction will produce an amplified 2f signal of opposite phase, resulting in motor operation in the other direction.

The motor 140 operates the slider of a potentiometer 142. The slider of potentiometer 142 is connected to one terminal of coil 134. The other terminal of coil 134 is connected to the junction of series connected D.C. current sources 143 and 144, the opposite ends of which are connected to respective ends of the potentiometer 142 winding. The flux passing through the pipe as a result of the D.C. current flowing through coil 134 is in a sense to oppose the ambient flux in the pipe. Motor 140 will continue to move the slider of potentiometer 142 until the net D.C. flux is reduced to zero, i.e., until the ambient flux in the pipe is balanced by an equal and opposite flux from the coil 134.

Prior to passing the electromagnet 130 through the pipe, a degausser should be passed therethrough to eradicate previous magnetic history and to reduce the residual induction to a very low value. It is preferable to use a degausser of the type illustrated in FIG. 22 which will leave the pipe with a small but constant ambient field, preferably in equilibrium with the earth's magnetic field. If the pipe is left with a stronger field, more energy will be required to reduce the net ambient field to zero.

Any magnetic discontinuity in the pipe, such as will be caused by flaws in the pipe, corrosion, welds, collars, supporting iron, etc. will result in a local concentration or rarefaction of the ambient field. For example, if the degausser is passed through the pipe so as to leave an ambient field from left to right or south to north, a thin place in the pipe wall will result in a south seeking pole at the left and a north seeking pole at the right. The presence of such a magnetic anomaly in the magnetic circuit between the pole faces will, in effect, create a local net ambient field which cannot be balanced out at the previously existing setting of the slider of potentiometer 142. However, presence of the net ambient field will cause an amplified 2f signal to be delivered to the motor 140 which will cause the slider of potentiometer 142 to move toward a new null position. As a result, the current flowing through the coil 134 will be changed. This change in current produces a voltage change across a resistor 143' which may be used as a measure of the strength of the net ambient field produced by the anomaly. The voltage across the resistor 143' may be considered a bias voltage since the flux in the coil 134 is a bias flux intended to reduce the net D.C. field between the pole faces to zero. The voltage change across the resistor 143' may be applied to an oscillator modulator 144' to modulate a suitable carrier, the modulated carrier being recorded on a suitable device such as a wire recorder 145. The change in bias voltage, and hence the recorded quantity, varies linearly with the change in magnetic characteristics of the pipe which produces the change in bias voltage. The recorded information may subsequently be demodulated in a linear demodulator and the demodulated signal applied to a graphic recorder, as in FIG. 15.

In order for the recorded information to be meaningful, it is necessary to know where along the pipe the anomaly occurred. This information may be provided as described in connection with FIG. 16. Another means for securing such positional information is shown in FIG. 21. In this figure, a wheel 146 is arranged to be in contact with the inside surface of the pipe and to rotate from frictional engagement as the sensing device progresses. Each time a predetermined number of revolutions has occurred, as determined by a suitable Geneva movement or the like, a switching mechanism 147 may be operated to modulate the carrier frequency of an oscillator-modulator 148, the output of which is supplied to wire recorder 145.

As indicated previously, a number of harmonics will be created in the waveform of the source 136 in the presence of an ambient field in the pipe iron between the pole pieces 132 and 133. One of these harmonics (preferably the second) can be used to achieve a null, as described. However, other harmonics and particularly harmonic ratios can be used to provide valuable information as to the character of the magnetic anomaly detected. Harmonics caused by a hysteresis loop of the pipe iron (odd harmonics) will be a function of the thickness of the iron and also of the type of iron and thus will show changes in iron structure such as may be caused by welding. The ratio of second to third harmonic is useful in interpretation of the log. A record of the third (or other harmonic) can be obtained by means of a tuned band pass filter 149 the output of which is used to modulate the carrier generated by an oscillator-modulator 150, the modulated carrier being recorded by the wire recorder 15. The separate carrier frequencies from the oscillator-modulators 144, 148 and 150 should be sufficiently separated to prevent overlapping of their respective sidebands.

In the practical construction of FIG. 20, the coils 134 and 135 are wound one above the other, the adjacent turns being separated by an insulating layer 151. The electronic equipment of FIG. 21 may conveniently be located in the housing ends 152 and 153. The sensing device is supported for motion in the pipe 136 by wheeled platforms 154 and 155. The flow of by-passed fluid through apertures in the platform and around the outside of the housing is shown by arrows. In addition, a central passage 156 may be provided to permit additional fluid by-pass. Velocity of the sensing device in the pipe may be controlled by automatically controlling the amount of by-passed fluid.

Figure 23:
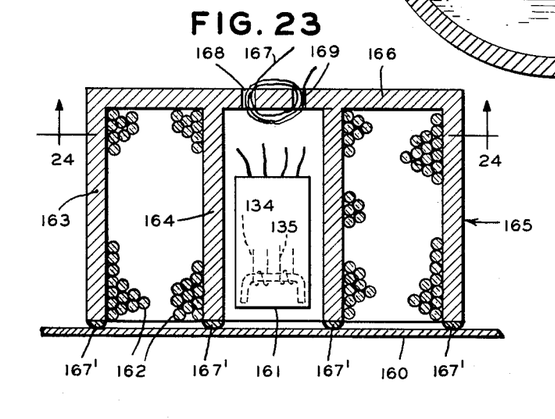
FIG. 23 is a cross-sectional view of a survey device according to the invention for surveying a flat metal surface.
Figure 24:
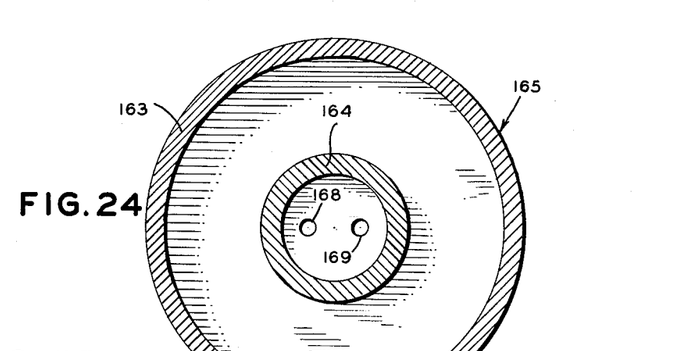
FIG. 24 is a sectional view taken along the line 24—24 of FIG. 3.

As mentioned previously, the principles of the invention are applicable not only to the logging of pipes but also to the inspection of other magnetic metal structures, such as tanks, beams and the like. An apparatus for performing such inspection of an extensive metal surface is illustrated in FIGS. 23 and 24. In FIG. 23 the iron surface 160 might be the outside of a large steel tank or a large steel beam. The sensing element 161, which may be, for example, of the type shown in FIG. 21, or any of the others depicted, is disposed opposite the surface 160. In order to isolate the surface segment opposite the detector from extraneous magnetic influences and in order to provide this segment with a standardized magnetic history which will be the same as the history of all other segments traversed, there is provided an isolating coil 162. The coil 162 is carried between annular legs 163 and 164 of a magnetic structure 165. The legs 163 and 164 are joined magnetically by a core element 166 which is remote from and generally parallel to the surface 160. The detecting element 161 is carried in the space within the leg 164. The legs 163 and 164 may be provided with wheels or casters 167' to facilitate moving the structure 165 over the surface 160. The gap provided thereby also aids preventing the structure 165 from adhering firmly to the surface 160.

The coil 162 carries a current which produces a saturation flux in the iron disposed opposite the coil, in effect completely magnetically isolating the iron segment opposite the detector 161. As the structure 165 is caused to traverse the surface 160, the detector 161 comes opposite an iron segment which had just previously been opposite the coil 162. Any magnetic anomalies in the segment opposite the detector 161 will be sensed and recorded as previously described.

Return of the iron from its saturated condition (when opposite coil 162) to the equilibrium condition desired for sensing is a transient effect which is limited in speed by eddy currents. The speed of motion of the structure 165 should not be so great that the radial distance between the inner edge of the saturating coil 162 and the outer edge of the detecting or sensing zone will be traversed in a time interval in which eddy currents maintain the flux in the detecting zone above its equilibrium value as determined by the hyteresis loop of the iron. The permissible maximum speed of motion is thus related to the thickness of the iron, being inversely proportional thereto. For one quarter inch iron, a time of traverse of this radial distance of about 0.1 second will generally be satisfactory, while for one half inch iron the time may be about 0.2 second.

The isolation coil 162 is preferably provided with a D.C. current component for saturating the iron opposite thereto and an A.C. component to maintain the coil core in equilibrium so that no ambient flux will disturb the detector. The saturation flux should, for most purposes, be of the order of 19,000 lines/cm.$^2$ for the grades of iron generally used in tanks and similar structures. However, lower fluxes may be used where the flaws to be detected are relatively large so that lower sensitivity detection can be used, requiring less complete isolation.

Where the core 166 is spaced relatively close to the surface 160, the core 166 may be placed in magnetic equilibrium by passing an alternating current through a coil 167 which passes through holes 168 and 169 in the core 166. The core 166 and the legs 163 and 164 are preferably made from an iron with a low coercive force to facilitate degaussing of the core and legs.

The pole faces of the detector can be shaped to accommodate the character of the surface being inspected. The shape of the structure 165 can similarly be selected to accommodate particular surface configurations.

Figure 26:
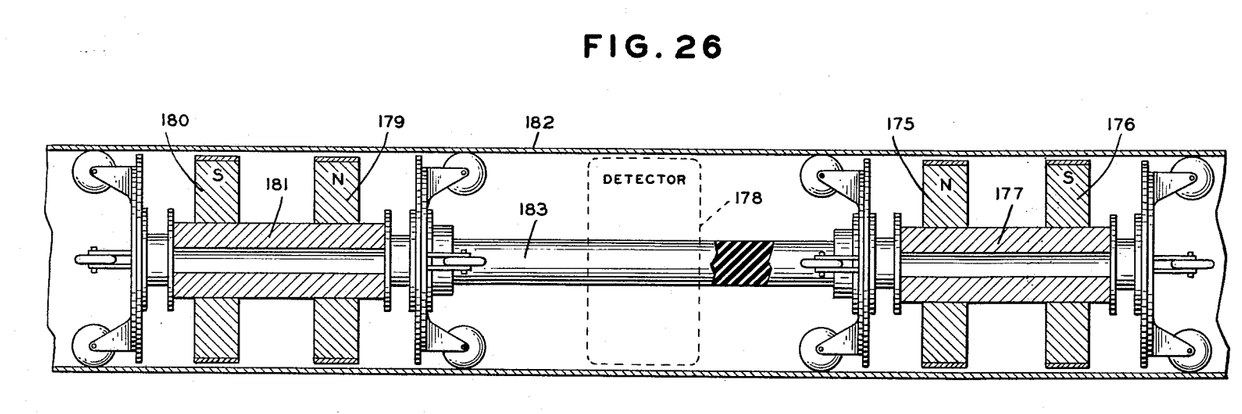
FIG. 26 is a longitudinal cross-sectional view of a length of pipe with a modified detector according to the invention located therein.

In some cases it may be desirable magnetically to isolate a section of pipe. The magnetic isolation principle illustrated in FIG. 23 may be used for this purpose, as shown in FIG. 26. In FIG. 26, a north seeking radial magnet 175 and a south seeking radial magnet 176 joined by an iron core 177 precede the detector or sensing structure 178, while a north seeking radial magnet 179 and a south seeking radial magnet 180 joined by an iron core 181 follow the sensing structure. The magnet assemblies and the sensing structure may be separated by a flexible non-magnetic member 183, which might be a rubber hose. The magnets should create sufficient flux to saturate the adjacent iron in the pipe 182, thereby achieving both a standardized magnetic history and magnetic isolation of the sensing structure. The north and south seeking poles can, of course, be interchanged.

While the invention has been described in connection with specific embodiments thereof and in specific uses, various modifications thereof will occur to those skilled in the art without departing from the spirit and scope of the invention as set forth in the appended claims.

What is claimed is:

1. In apparatus for testing magnetic pipe, the combination comprising a generally circular supporting member made of non-magnetic material and having a generally U-shaped slot extending around the periphery thereof, a generally U-shaped lining in said slot, said lining being made from a magnetic material, a pair of axially spaced, insulated coils wound around said member within said slot, a third coil wound around said member and disposed between the first and second coils, and a saturable magnetic tape wound around the turns of said third coil in a direction generally radial with respect to said member.

2. Apparatus as set forth in claim 1 in which said generally U-shaped lining is constructed so that the ends thereof approach closely the walls of said pipe when said apparatus is inserted therein.

3. Apparatus as set forth in claim 1 in which said tape is made of relatively thin steel which is readily saturable at a frequency of the order of 750 cycles per second.

4. In apparatus for testing magnetic pipe, the combination comprising an annular supporting member made of non-magnetic material and having a generally U-shaped slot extending around the periphery thereof at an intermediate point thereon, a generally U-shaped lining in said slot, said lining being made from a magnetic material, a pair of axially spaced, insulated coils wound around said member within said slot, a third coil wound around said member and disposed between the first and second coils, a saturable magnetic tape wound around the turns of said third coil in a direction generally radial with respect to said member, pipe engaging means attached to said supporting member adjacent each end thereof for guiding the latter through said pipe under the force exerted thereon by the fluid flowing in said pipe.

5. Apparatus as set forth in claim 4 in which said pipe engaging means includes a wheeled platform.

6. Apparatus as set forth in claim 4 in which said pipe engaging means includes a deformable annular flange having a diameter slightly greater than the internal diameter of said pipe.

7. In apparatus for testing magnetic pipe, the combination comprising an annular supporting member made of non-magnetic material and having a generally U-shaped slot extending around the periphery thereof, pipe engaging means for guiding said supporting member through said pipe under the action of the fluid carried by said pipe, a generally U-shaped lining in said slot, said lining being made from a magnetically soft iron, a pair of axially spaced, insulated coils wound around said member within said slot, a third coil wound around said member and disposed between the first and second coils, a tape wound around the terms of said third coil in a direction generally radial with respect to said member, said tape being readily saturable at a predetermined frequency, a source of sinusoidal alternating current of said frequency, means to connect said source to said third coil, a pass filter tuned to the second harmonic of said frequency and connected to said first and second coils, and a recording mechanism coupled to the output of said filter for recording, as a function of time, impulses of energy at said second harmonic frequency induced in said first and second coils.

8. Apparatus as set forth in claim 7 in which said source, said filter and said recording mechanism are carried by said supporting member.

9. In apparatus for testing magnetic pipe, the combination comprising a supporting member made of non-magnetic material and having a generally U-shaped slot extending around at least a portion of the periphery thereof, said supporting member being constructed so as to pass through said pipe in an axial direction, a generally U-shaped lining in said slot, said lining being made from a magnetic material, a pair of axially spaced, insulated coils wound around said member within said slot, a third coil wound around said member and disposed between the first and second coils, and a saturable magnetic tape wound around the turns of said third coil in a direction generally radial with respect to said member and for a predetermined arc of the periphery of said member.

10. In apparatus for testing magnetic pipe, the combination comprising an annular supporting member made of non-magnetic material and having a generally U-shaped slot extending around the periphery thereof, a generally U-shaped lining in said slot, said lining being made from a magnetic material, a pair of axially spaced, insulated coils wound around said member within said slot, a third coil wound around said member and disposed between the first and second coils, and a saturable magnetic tape wound around the turns of said third coil in a direction generally radial with respect to said member and for a limited arc of the periphery of said member.

11. Apparatus as set forth in claim 10 in which said tape is wound around the turns of said third coil over a plurality of spaced arcs of the periphery of said member.

(References on following page)

References Cited in the file of this patent

UNITED STATES PATENTS

| | | |
|---|---|---|
| 1,867,685 | Sperry | July 19, 1932 |
| 1,984,465 | Dana | Dec. 18, 1934 |
| 2,388,683 | Frickey et al. | Nov. 13, 1945 |
| 2,488,277 | Falk | Nov. 15, 1949 |
| 2,603,688 | Cole | July 15, 1952 |
| 2,650,344 | Lloyd | Aug. 25, 1953 |
| 2,655,633 | Minor et al. | Oct. 13, 1953 |
| 2,671,197 | Barnes et al. | Mar. 2, 1954 |
| 2,740,090 | Dionne | Mar. 27, 1956 |
| 2,770,773 | Cooley | Nov. 13, 1956 |
| 2,817,060 | Stateman et al. | Dec. 17, 1957 |
| 2,834,113 | En Dean et al. | May 13, 1958 |
| 2,841,778 | Ball et al. | July 1, 1958 |
| 2,892,150 | Nettles et al. | June 23, 1959 |
| 2,992,390 | De Witte | July 11, 1961 |